Figure 1:
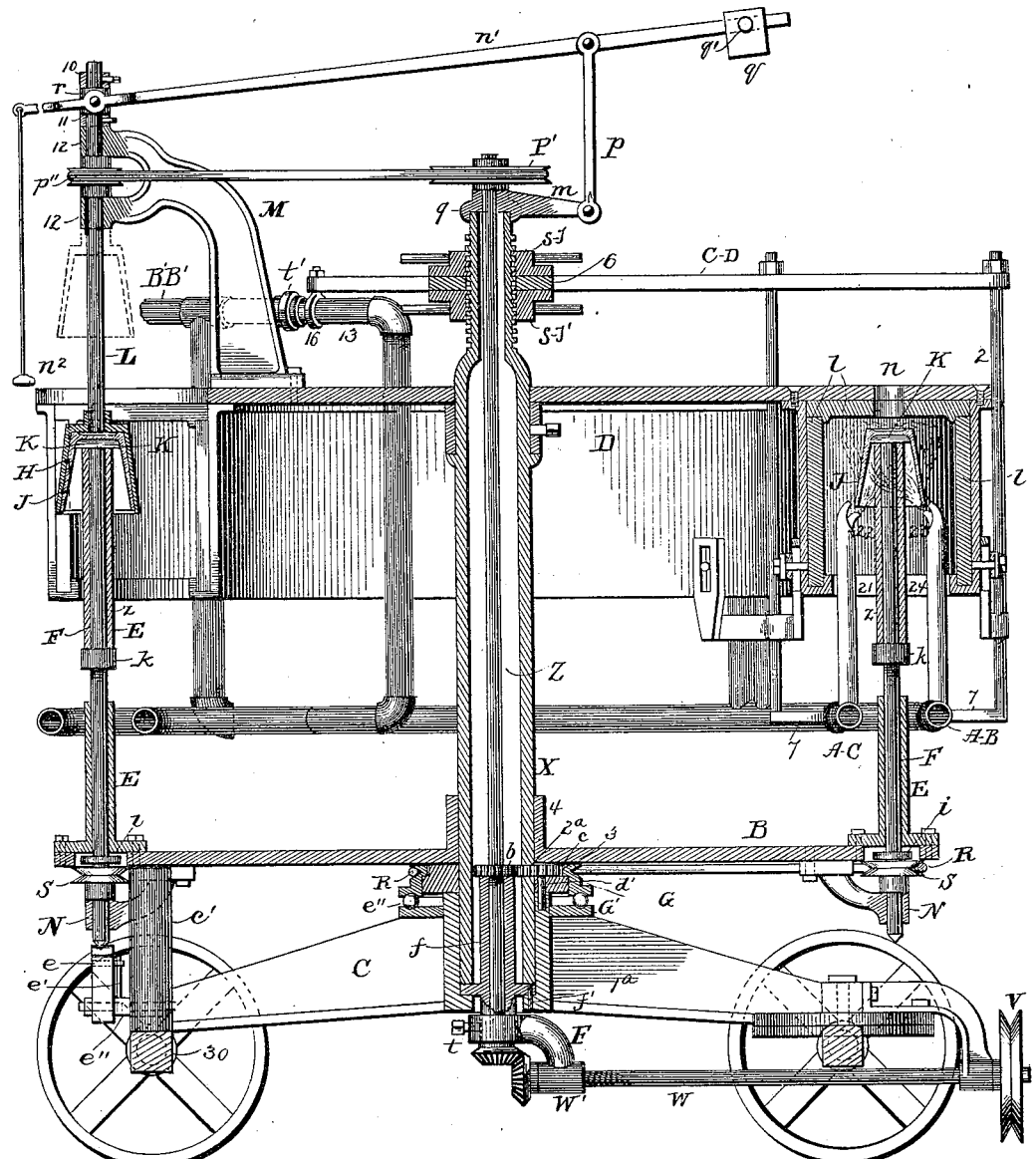

(No Model.) 6 Sheets—Sheet 1.

J. R. BRIDGES.
MACHINE FOR FINISHING TUMBLERS, &c.

No. 592,645. Patented Oct. 26, 1897.

(No Model.) 6 Sheets—Sheet 3.

J. R. BRIDGES.
MACHINE FOR FINISHING TUMBLERS, &c.

No. 592,645. Patented Oct. 26, 1897.

Witnesses
E. J. Nottingham
G. F. Downing

Inventor
J. R. Bridges
By H. A. Seymour
Attorney (No Model.) 6 Sheets—Sheet 4.

J. R. BRIDGES.
MACHINE FOR FINISHING TUMBLERS, &c.

No. 592,645. Patented Oct. 26, 1897.

Witnesses
E. J. Nottingham
G. F. Downing

Inventor
J. R. Bridges
By H. A. Seymour
Attorney (No Model.) 6 Sheets—Sheet 5.

J. R. BRIDGES.
MACHINE FOR FINISHING TUMBLERS, &c.

No. 592,645. Patented Oct. 26, 1897.

Witnesses
E. J. Nottingham
G. F. Downing

Inventor
J. R. Bridges
By H. A. Seymour
Attorney

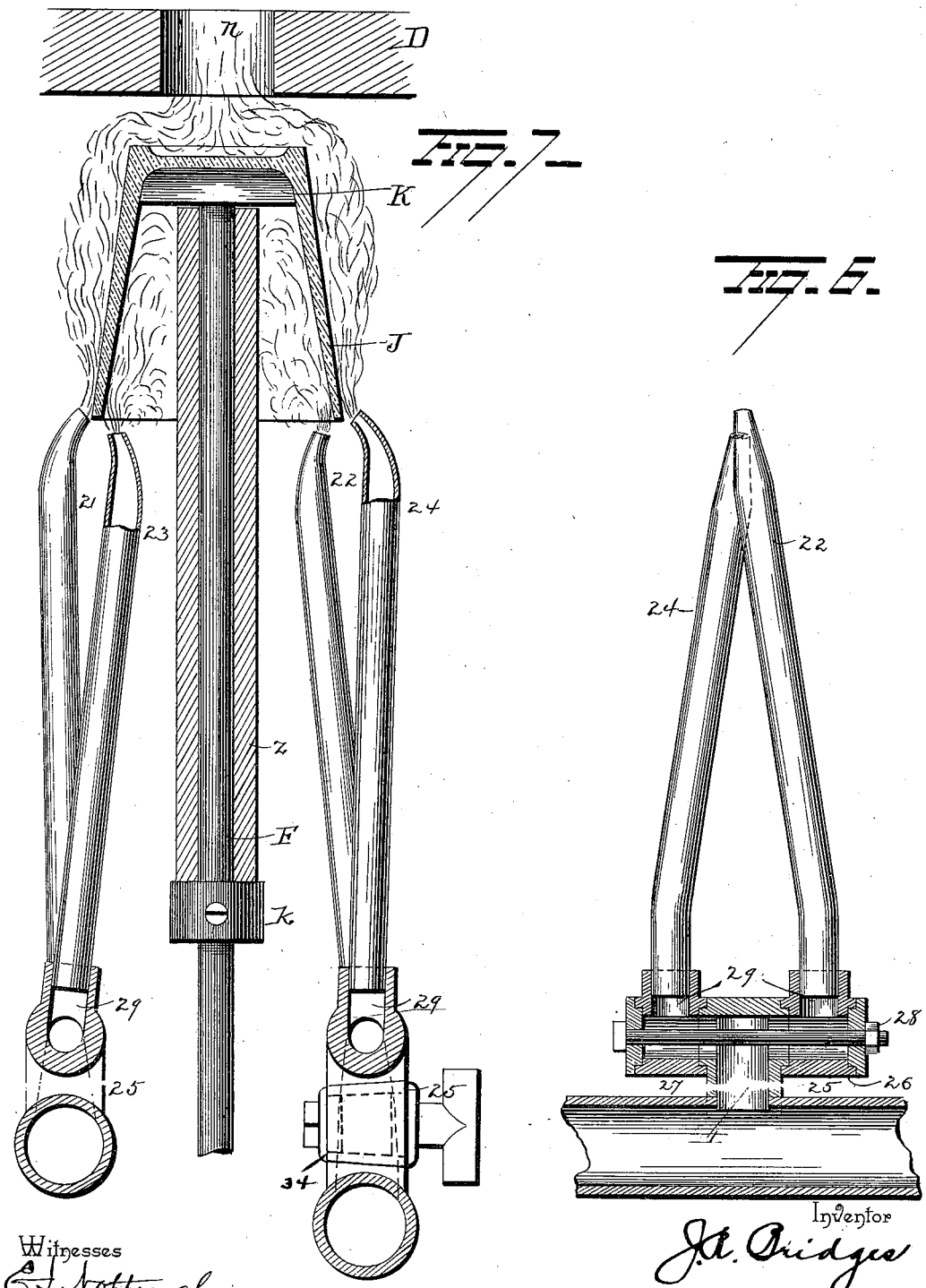

UNITED STATES PATENT OFFICE.

JOHN R. BRIDGES, OF FINDLAY, OHIO.

MACHINE FOR FINISHING TUMBLERS, &c.

SPECIFICATION forming part of Letters Patent No. 592,645, dated October 26, 1897.

Application filed December 6, 1895. Serial No. 571,300. (No model.)

*To all whom it may concern:*

Be it known that I, JOHN R. BRIDGES, of Findlay, in the county of Hancock and State of Ohio, have invented certain new and useful Improvements in Machines for Finishing Tumblers and other Flat Ware; and I do hereby declare the following to be a full, clear, and exact description of the invention, such as will enable others skilled in the art to which it appertains to make and use the same.

My invention relates to an improvement in machines for finishing tumblers and other flat ware.

In the manufacture of glassware many articles are made having no leg or stem—such as tumblers, nappies, &c.—which it is desirable to fire-polish and finish. This class of ware is usually fire-polished and finished in the following manner: A tumbler after having been pressed and removed from the mold is still quite hot, especially the bottom part, which is then uppermost, to which is then applied a "punty." A punty is a round piece of glass flattened on the end approximately corresponding to the diameter of the bottom of the tumbler to be finished. This piece of glass is on the end of an iron rod of a suitable length, the glass of the punty being kept at a temperature that will cause it to adhere to the hot bottom of the article when placed centrally upon it. The article is then placed in the glory-hole and revolved slowly by a boy turning the opposite end of the rod in his hands, a suitable rest being provided in which to rest the rod near the glory-hole. When sufficiently hot, it is handed by the boy to a workman seated in a "chair" of the usual construction, and is by him revolved and shaped with a wet wooden "buffer." When finished and sufficiently cold, the rod is struck a sharp quick blow with the buffer, when the article will be detached from the punty and fall into a suitable receptacle. It is then carried into the leer to be tempered. Very frequently an iron head on the punty is used instead of the glass, which will also adhere to the glass if kept at a good red heat. The use of either very often causes small pieces of the bottom of the tumbler to chip off when the tumbler is detached, and when an iron head is used, beside being often chipped, the iron leaves a part of itself on the glass in the shape of a reddish-black stain. In both cases the bottom of the article is rough and jagged and must be ground and polished on suitable stones and wooden polishing-wheels if the article is to be rated first class; but a very large quantity of this kind of ware is put upon the market without being so ground and polished.

Another style of finishing tumblers and smaller articles is to place them on coming from the mold in a cast-iron cup on the end of an iron rod, leaving a part of the upper end of the article protruding from the cup, which is then heated and finished, as before. Only that part of the article exposed can be touched by the fire. That part in the cup is not fire-polished at all. This method obviates the necessity of grinding the bottom, but fails to perfectly polish the article.

Flat dishes, usually termed "nappies," are often fire-polished and finished on punties and are ground on their bottoms after coming out of the leers, the best ware being so treated. A cheaper method has come to be universally used which obviates the necessity of grinding, which method is to place the article on an iron punty, turned and shaped to fit the inside of the article and fastened in its center underneath to the end of a rod, which is turned up at a right angle to its length, this turned-up part of the rod being short, only sufficiently long that when the article is placed on the punty the suspended edge of the glass will not touch the long rod underneath, which serves as a handle to hold the glass in the glory-hole, from which it is taken when properly heated and quickly turned and dropped right side up on an iron plate in front of a workman, who at once places a "former" on its inside and then with wet wooden buffers rubs the outside of the glass up to the former, continuing to do so until the glass has become cold enough to stand without bending or losing its shape. This method makes very good ware when skilful workmen are engaged in the operation, but the inside of the articles are not well polished and the edges are often unequally melted owing to the punty interfering with the fire reaching the inside and parts of the edges.

My improvement is adapted to all this class of ware. In my sketches I have shown a tumbler, the parts being arranged accordingly, and one familiar with the art will easily see how it may be arranged for many other articles. This is only a modification of my machine for fire-polishing and finishing goblets and other stemmed glass, Serial No. 552,264, filed June 10, 1895, the principle being the same, but having mechanical parts different.

Figure 2:
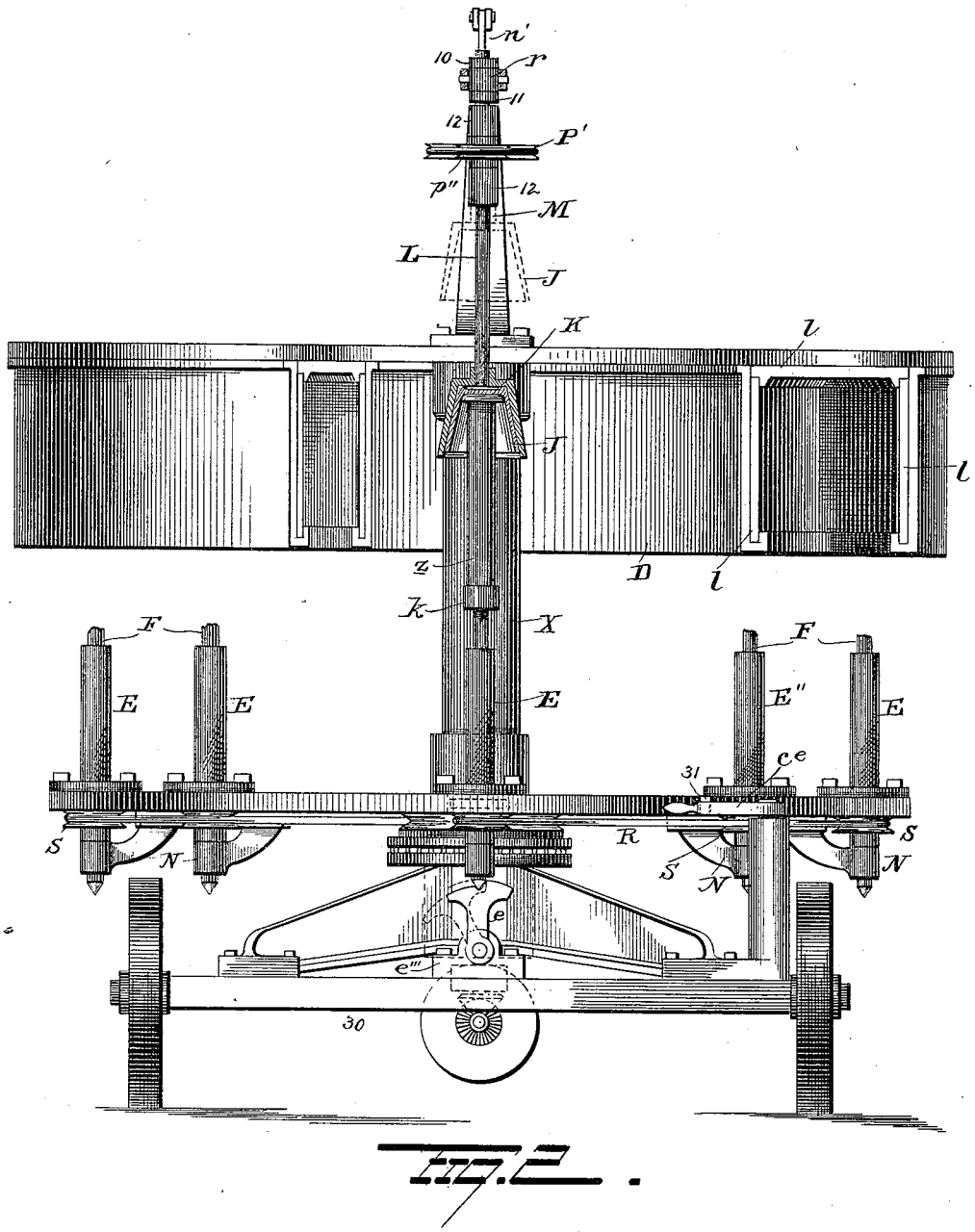
Figure 3:
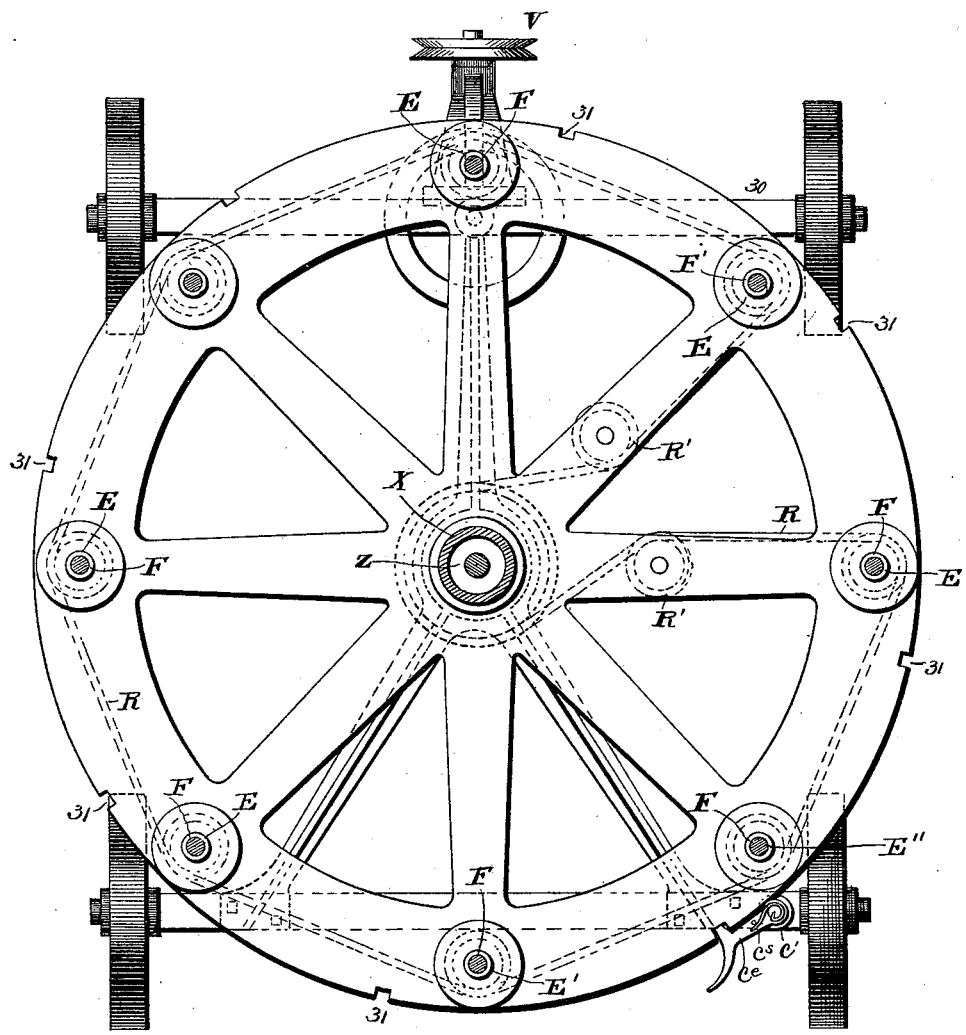
Figure 4:
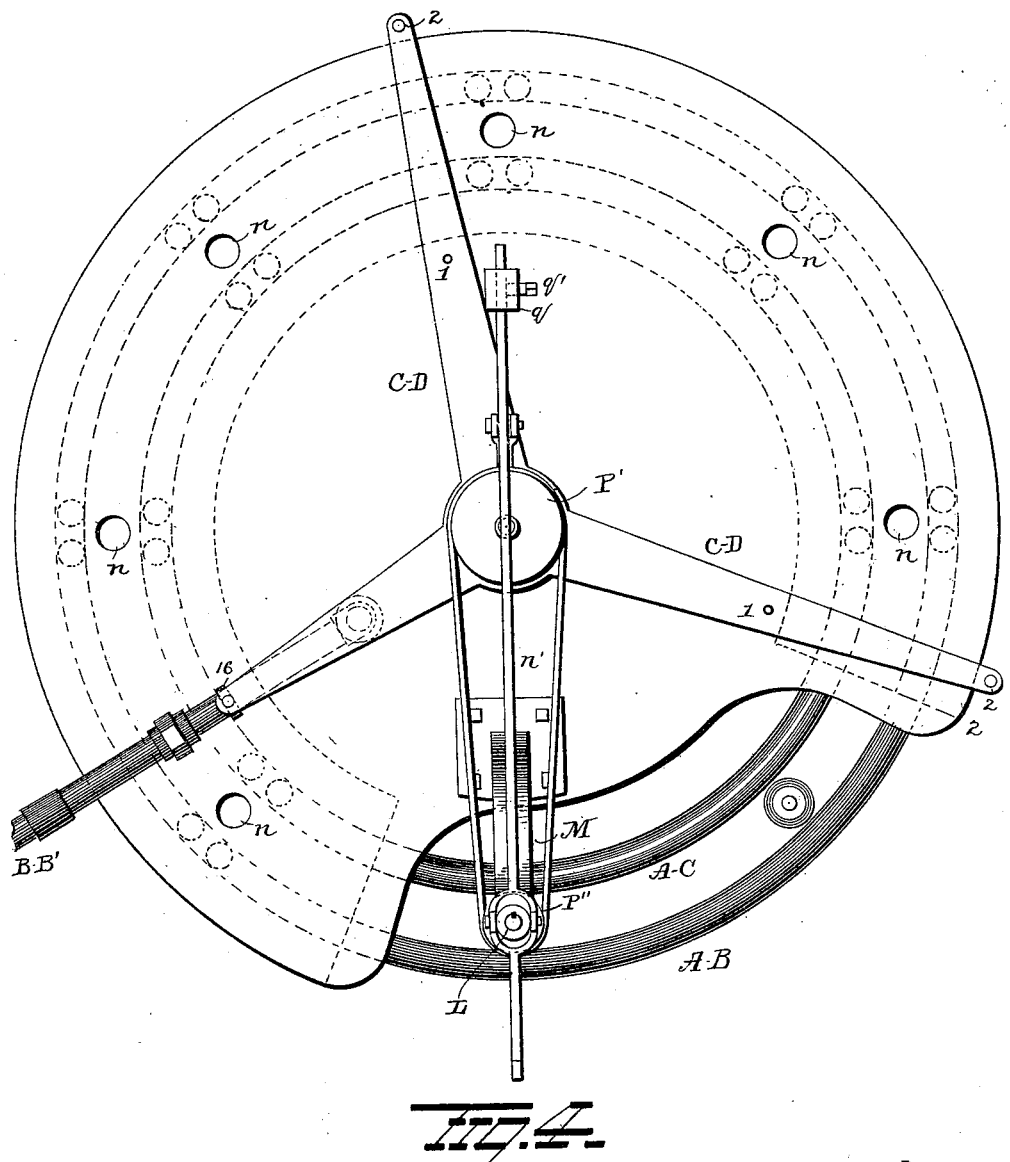

In the accompanying drawings, Figure 1 is a vertical section on the line A E of Figs. 3 and 4. Fig. 2 is a view in end elevation. Fig. 3 is a plan view immediately over the plate B. Fig. 4 is a plan view over the flue D. Figs. 5, 6, 7, 8, and 9 are details of various parts.

The wheels, axles, legs, and column X are the same as in the goblet-machine, as is also the upright shaft Z and the horizontal shaft W, with the exception that it does not extend through to the axle 30, but having a similar driving-pulley V on its outer end, and has similar bevel-gears for rotating the shaft Z with its pulley on the extreme upper end which drives the finishing mechanism. Resting on the shoulder in the lower part of the step in which stands the column X is the flange $1^a$ on the long bearing $f$ of the upright Z. Attached to the lower end of $f$ by a set-screw $t$ is the collar and arm T of the bearing W'. A pin $f'$ passes through the flange of the bearing $f$ and into the shoulder of casting C. This pin keeps the bearing $f$ from turning or changing its position. The column X stands with its lower end resting on the flange of $f$. On the upper end of bearing $f$ rests a pinion $b$, which is permanently affixed to the shaft Z. This pinion $b$ meshes into and revolves the idler-gear $c$, which in turn engages with the teeth on the interior of the large pulley G. An opening $2^a$ is cut through the column X to allow the idler-gear to engage the teeth of the pinion $b$. The pulley G revolves around the ring $d$, a part of which is removed, as at 3, to allow the idler-gear $c$ space in which to sit and revolve, which it does on the pin $d'$, which pin extends through the balance of the thickness of the ring $d$ under the gear $c$ into the collar or central part C' of the base C. Around this part C' and resting on top of base C is the flat ring G', between which and the foot of the pulley G are a number of bearing-balls $c''$, running in suitable grooves in each.

Figure 5:
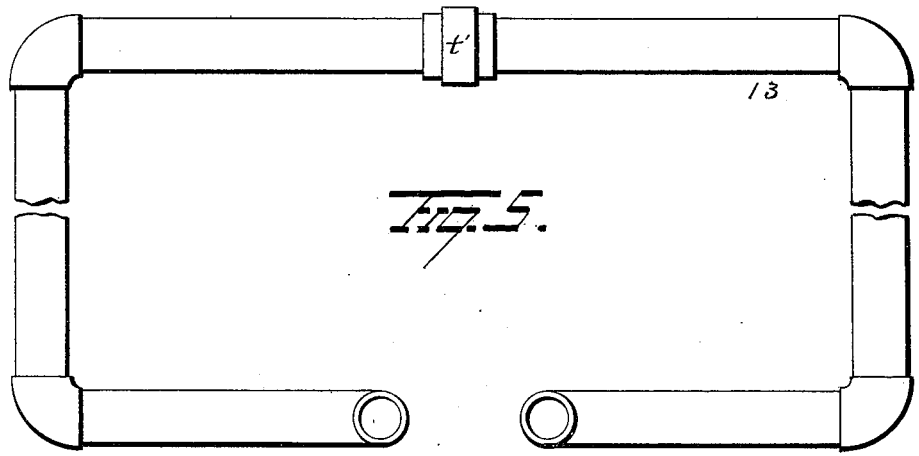
Figure 8:
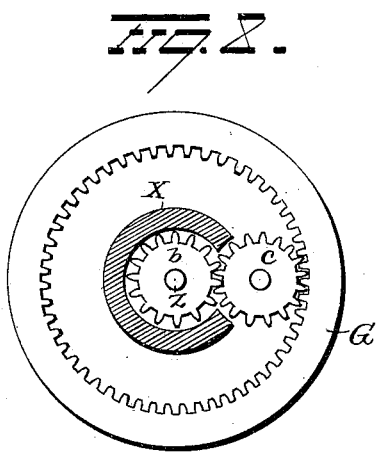

B is a circular plate having a collar 4 surrounding the column X, around which it is free to revolve when desired. B rests upon the pulley G, and the weight of both is carried by ring G', the intermediate bearing-balls $c''$ forming a frictionless bearing. Upon the upper surface of the plate B, at its outer edge, is located a series of eight long upright bearings E at properly-spaced distances from each other. In these bearings E revolve the upright shafts F, also supported at their lower ends by the bearings N, both E and N being securely bolted to the plate B. Resting upon the bearings N and revolving freely around the shafts F are the pulleys S, immediately above which and resting upon their upper surface are the collars $i$, which are securely attached to the shafts F. The friction of the collars $i$ on the surface of the pulleys S causes the shaft F to revolve. A belt R from the central pulley G, carried out to and around the series of pulleys S, serves to revolve all of these shafts F. Above plate B are located two circular pipes, AB the outer one and AC the inner one, connected together by suitable pipes. The point B' B', Figs. 1 and 5, is where the air and gas is admitted to the pipes.

$t'$ is a union on pipes 13 to facilitate the connection of the inner and outer pipes.

In this machine I show the air and gas mixed at the point of entrance to the pipes of the machine and then carried to the burners, a suitable mixer being attached to the point B' B' to affect the mixing.

At proper points around the pipes AB and AC are placed the burner-pipes, from the nozzles of which the mixed air and gas escape and are burned.

On the upper end of the column X is cut a thread on which the nuts ST and ST' are placed and between which the collar 6 of the arms CD is held. Suspended from two of the arms CD (see Fig. 4) are the rods 1 and 2, from whose lower ends extend a part 7 at right angles, whose ends encircle and support the pipes AB and AC. One of the arms CD (see Fig. 4) is shorter than the other two and is located over the connecting-pipe 13, to which it is attached by the ring-bolt 16. By this arrangement the entire series of burners and connecting-pipes are simultaneously raised or lowered to adjust the burners to the article to be heated and fire-polished in the flue D by turning the nuts ST and ST accordingly. The object of the two nuts being to prevent any tilting of the arms and pipes by bringing the two nuts tightly against the collar 6 of the arms, they with the connected pipes are held parallel with the faces of the nuts.

On the upper ends of the upright shafts F are the round plates K, whose upper surfaces and edges conform to the shape and size of the inside bottom of the suspended tumblers. The plates K are detachable from the shafts F in order to facilitate the changing when another or different-sized tumbler or other article is to be finished in the machine. Under the plate K and extending down to the collar $k$ or shaft F is a thimble $z$, encircling the shaft F, made of clay or other suitable material to protect the shaft F from the heat of the burners.

To the under side of plate A and part way around its outer circumference is suspended the flue D, the sides and top of which are lined with sections of clay or brick, (shown by letters $l$.) Any other fire-resisting material may be used for this purpose, and immediately over the bottom of the tumbler, where it stops over the burners, are holes $n$ in the top of flue D for the purpose of allowing the burned gases to escape, and which should be as small as is found sufficient for the escape of the gases, it being desirable that the flame and heat of the burners should be forced to turn over the corner of the bottom of the tumbler in order that it may be melted and smoothed at that point, as well as at other parts. This makes it unnecessary to grind the bottom of the article. It will be observed that two of the burners 22 and 23 throw their flame on the inside, and two, 21 and 24, on the outside, of the tumbler J. Such being the case, it follows that but a small part of the surface of the tumbler would receive sufficient heat to polish. To present all the surface in succession, the shaft F is revolved slowly and with it the tumbler resting thereon. The flame thrown into the inside of the glass will fill the interior and escape by curling under the edge and, rising up the sides, will assist the flame from the outside burners in polishing and heating the outside surface of the glass, the small part of the inside surface covered by the plate K being the only part not reached by the flame, but this part of any pressed article of glass is usually smooth and bright by reason that the point of the plunger of the mold being the smallest is always the hottest part of a mold when working.

On the top of the column X is a cap 9, having an arm $m$ extending therefrom, the cap being tightly secured to the column and having a hole through its center which serves as a bearing for the shaft Z, a link $p$, supported on the arm $m$, serving as a fulcrum for the lever $n'$ of the finishing mechanism. The link $p$ allows the yoke encircling the trunnioned collar $r$ to move up and down in a vertical line. Above collar $r$ is a collar 10, attached to shaft L by a set-screw, and below it another collar 11 is similarly attached. Between the bearings 12 12 on the standard M is the pulley P'', having on its interior a key permanently affixed and which slides in a long keyway in the shaft L, by means of which the shaft L is revolved by the pulley P'' whatever be its perpendicular position. To the lower end of shaft L is removably affixed the cup or former H, which is represented as being in its lowest position and covering the tumbler J, while the dotted lines above show it when at its highest position. Former H should be so made that it may be detached from shaft L when desired, as the former must be changed when a different sized or shaped article is to be finished.

On the end of the lever $n$, opposite the finishing mechanism, is a weight $q$, held at any desired position (to balance the parts on the other end of $n$) by a set-screw $q'$.

By the operator grasping the suspended knob $n^2$ he is able at the proper times to bring down the cup H onto the glass J and finish the same.

As shown, when the bearing E' comes into position in the center from the left, the pointed lower end of shaft F strikes the rocker $e$, which was then in the position shown by the dotted lines, and as the shaft F comes to position the shoulder or higher part of rocker $e$ being in line of the movement of the point of the shaft F it is carried along with it, and as a bearing for the point of shaft F on $e$ comes to a vertical position it lifts the shaft F and also the collar above the pulley S, which no longer resting thereon the motion which it has been imparting to the collar ceases, and therefore the shaft F comes to rest and so remains until the attendant pulls down the former H, which is continually revolving at a high speed, which when the inside bottom of the former H strikes and bears upon the bottom of the tumbler J causes the tumbler to revolve at the same rate of speed as the former H, the result of which is to cause the tumbler J by the centripetal force of the centrifugal action to flare or expand and fill the former H, taking whatever may be the shape of the inside surface of the former H. This former H should be preferably made of copper or brass and the inside surface very smooth. It will be observed that by this method there is no rubbing of the surface of the glass by the former or cup H and therefore nothing to scratch the surface. The fact of the glass lying against the surface of the metal in no wise injures or mars the polish secured by the fire.

The object of lifting the collar $i$ from the pulley S is that the shaft F may revolve with the least friction and as freely as possible, this being secured by resting the point of the shaft F upon the rocker $e$. On the operation of finishing the tumbler being completed and it is desirable to again move the plate B the point of the shaft F will move to the right, carrying the rocker $e$ with it, until the point passes sufficiently far to slip off the shoulder of the rocker, when it will at once return to the position indicated by the dotted lines, a spring $e'$ (see Fig. 1) at the back of the rocker causing this action, a suitable casting $e'''$, bolted to the axle 30, serving to hold the pin $e''$, in which the spring $e'$ is inserted and on the end of which the rocker $e$ reciprocates, held to place by a nut or pin through the end of $e''$.

Under the upright bearings E are holes through the plate B a little larger in diameter than the collars $i$, in which they move up and down when lifted or released by the rocker $e$.

By referring to Figs. 1 and 2 it will be seen that it takes several revolutions of the shaft Z and pinion $b$ to revolve pulley G once, while one revolution of the pulley P' on the upper end of the shaft Z will revolve the pulley P'' on the shaft L of the finishing mechanism several times. The sizes of the different pulleys and gears are so proportioned that the pulleys S will revolve slowly, while the pulley P" will revolve at a much greater speed.

The positions of the bearings E, under which the pulleys S are situated, are shown more in detail in Fig. 3, as is also the belt R. This belt passes around the central pulley G, passes out and against the inner sides of the idler-pulleys R', then to the next nearest pair of the series of pulleys S, around which it turns in opposite directions, then around all the others, but only touching a part of their diameters on the outer side. The belt B travels in the same direction as the plate B for the reason that plate B rests on the upper surface of the pulley G, which continually revolves when the machine is being used.

The column $c'$, which is part of the right-hand leg C, at the point where C rests on and is bolted to the axle 30 carries on its upper end and at the same height as the plate B a pawl $ce$, which catches into suitably-provided notches 31 on the edge of plate B, which serve to stop and hold plate B in such exact positions as will bring the tumblers suspended on the upper ends of shafts F immediately under and in line perpendicularly with the cup H of the finishing mechanism, and also over the burners in the flue D, when the pawl is in one of the notches. When it is desired that the plate B move to another position, the handle of the pawl $ce$ is grasped and the point of the pawl withdrawn from the notch, when, as the plate is resting on the pulley G, which is constantly revolving, it is evident that the plate B will be at once carried with G, but as the pawl $ce$ is released from the hand of the attendant as soon as the plate B has moved a little it at once bears against the edge of the plate B, being caused to do so by a suitable spring $cs$ on its upper surface. When the next notch comes into contact with the pawl, the plate B will again come to a stop. Bearing E' shows where the finishing mechanism is located, and E" where the finished article is removed and another just pressed is placed.

In Fig. 4 the location of the arms CD is shown in plan, and the points where the rods 1 and 2 are situated, as also where the ring-bolt 16 is affixed to the pipe 13, and a top view of the finishing mechanism. It will be observed that the pipes AC and AB are continuous, not having a section removed. This is not a matter of necessity, but only of convenience, the pipes not being in line of the finishing mechanism.

The operation of the machine can be best described from Fig. 4. A tumbler, being pressed and removed from the mold, is taken by the operator in a suitable pair of pincers and placed on the plate K bottom upward. The pawl then being withdrawn from the notch, the plate B moves to the next notch and comes to a stop, when another tumbler, having been pressed, is placed on the next plate K, which is then in the same position as was the first. The pawl is again released and plate B moves another space and comes to a stop, and another tumbler is placed on another plate K. The pawl is again withdrawn, and so on until the tumbler that was first placed on K comes out of the flue D and occupies a position under the cup H, which is then by the operator drawn down on the tumbler and it is finished. The plate K not yet having a tumbler on it, one is now placed there by the operator, who then releases the pawl and another, the second one placed in the machine, comes out of the flue D. This is finished at once while at its hottest, and then the one first finished is removed and another just pressed placed on the plate K. This operation is repeated indefinitely. It is necessary to always finish the tumbler that comes from the flue the instant that plate B stops, and then to remove the one previously finished and replace it with another just pressed.

Figs. 5, 6, and 7 show enlarged views of the preferred forms of burners. The burners shown in Fig. 1 are not adjustable to ware of different diameters, while these are. This burner can be adjusted to any size within the limits of the machine. AC and AB show the two circular pipes of the machine, upon the upper side of which is brazed or otherwise fastened a square part 25, to the sides of which, on its upper end, are two rings 26 and 27, having shoulders fitting into part 25, so that they may be held in proper position centrally on part 25, the outside ends being left solid. The holes in the ends should tightly fit the central bolt shown, a pair of jam-nuts 28 serving to bring and hold the whole together tightly. Any other method of construction might of course be used to obtain the same result. In the upper side of the rings 26 and 27 are the holes 29, into which the burner-pipes are screwed. The screws show the direction taken by the mixed air and gas from the pipe AB to the pipes 23 and 24, the same escaping from the points of the burners, as shown in 22, directing their flame to the inside of the glass and 21 and 24 to the outside. The stop-cock 34 in the part 25 is for the purpose of shutting off any one or more of the burners when it is found that the glass is being heated overmuch. To turn all the burners off partly will not do, as it is necessary that at some part of the flue the heat shall be very intense, thin light tumblers requiring less fire than a thick heavy one.

Figure 9:
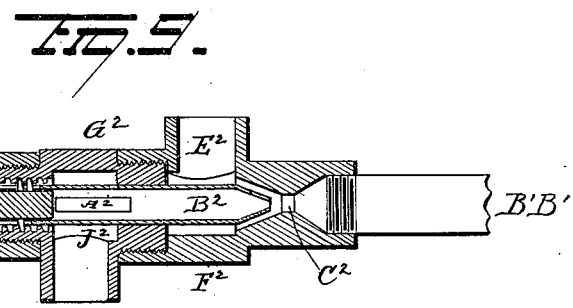

In Fig. 9 is shown a sectional view of the mixing-cock attached to the machine at B' B'. It is constructed of two principal parts $F^2$ and $G^2$, $G^2$ being screwed into $F^2$. At this point of connection in $G^2$ is a hole through which the pipe $B^2$ passes, fitting closely, as this part of $G^2$ forms the division between the air-chamber $J^2$ in $G^2$ and the gas-chamber $E^2$ in part $F^2$. In that part of pipe B in the air-chamber $J^2$ are the slots $A^2$, two in number, opposite each other. To the rear of the slots $A^2$ in the pipe $B^2$ is attached the stem $L^2$, on which is a short thread working into a similar thread in the part $G^2$. By turning the hand-wheel $K^2$ the pipe $B^2$ is moved to or from the contracted opening $C^2$ in the part $F^2$. B B is the point of attachment to the machine. At $E^2$ are attached the pipes admitting gas, a suitable cock being located on the pipe near the mixer-cock for the purpose of turning on or shutting off the gas, as desired. At $J^2$ similarly-arranged pipe and cock admit or shut off air under sufficient pressure to secure the most effective results at the burners in flue $D^2$. Gas, gasolene, or other fuel being admitted to the chamber $E^2$, it passes through the contracted opening $C^2$ into the pipes of the machine and issues from the burners, where it is ignited by the operator. Then the air is admitted to the chamber $J^2$, passing through the slots $A^2$ into the interior of the pipe $B^2$, issues from the nozzle, and through the opening $C^2$ into the pipes of the machine. As the two (air and fuel) pass through the opening $C^2$ they are thoroughly mixed and their quantities and force regulated by the air and fuel cocks, the hand-wheel $K^2$, through the stem $L^2$, moving the pipe $B^2$ to or from the opening C.

Any fuel in the form of gas or that may be taken up and vaporized by air may be used in the machine.

Having fully described my invention, what I claim as new, and desire to secure by Letters Patent, is—

1. In a glassware-finishing machine, the combination with a spindle adapted to receive the article being operated upon on its end, of burners, and a flue in which the article is placed when it is operated upon, said flue having an outlet immediately above the spindle for the escape of the flame across the exposed adjacent end of the article whereby to smoothen and finish said end and save grinding, substantially as set forth.

2. In a glassware-finishing machine, the combination with means for supporting the article to be treated solely from the inside, and burners, of a flue having an outlet immediately above the exposed bottom of the article and of less size than that of the bottom whereby the escaping flame is caused to impinge against the edges of the article and round and polish said edges and thus obviate the necessity of grinding, substantially as set forth.

3. In a glassware-finishing machine, the combination with a vertically-movable upright spindle having a collar thereon, of a rotary pulley upon which the collar rests and by means of which motion is imparted to it by frictional contact therewith, and means for raising said spindle whereby the collar is elevated above the pulley, substantially as set forth.

4. In a glassware-finishing machine, the combination with a vertically-movable upright spindle having a bearing on its extreme lower end, of a removable step or support adapted to receive and sustain said end bearing and means for revolving the spindle, substantially as set forth.

5. In a glassware-finishing machine the combination with a vertically-movable upright spindle having a collar thereon, of a rotary pulley upon which the collar normally rests and by means of which motion is imparted to the spindle by frictional contact therewith, and means for raising the spindle so that the collar is elevated from the pulley and means for applying rotary motion to the spindle from another source, substantially as set forth.

6. In a glassware-finishing machine, the combination with a spindle of means for applying rotary motion thereto from different points and at different speeds, substantially as set forth.

7. In a glassware-finishing machine, the combination with a revoluble spindle adapted to carry the article operated upon, of means for imparting a slow rotary motion to the spindle during the polishing process and means for giving an accelerated speed to the spindle after this polishing process, substantially as set forth.

8. In a glassware-finishing machine, the combination with a pipe, of a pair of rings capable of turning with respect to the pipe, burners connected with these rings, and a bolt passed through the rings and pipe for holding the rings and pipe together, substantially as set forth.

9. In a glassware-finishing machine, the combination with a spindle which travels in an orbit, of a pair of concentric gas pipes and burners leading therefrom on each side of the spindle, the spindle adapted to travel between said pipes and burners, substantially as set forth.

10. In a glassware-finishing machine, the combination with a series of spindles which travel in an orbit, of two gas-pipes, one located on each side of that orbit whereby the spindles travel between them, and burners leading in pairs from each pipe and disposed on each side of the spindles, substantially as set forth.

11. In a glassware-finishing machine, the combination with a central column having a threaded upper end, of several connected radial arms extending from this threaded portion pipes supported by these arms, and a nut on the threaded portion of the column above and below the arms for adjusting them up and down thereon, substantially as set forth.

12. In a glassware-finishing machine, the combination with a central column having a threaded upper end, of arms having a vertically-adjustable connection with the column, nuts on the threaded portion of the column to effect their adjustment two continuous circular and concentric pipes, a supply-pipe connecting them together and suspended from one of the arms, rods extending downward from the other arms and connected with these concentric pipes, and guides for these rods, substantially as set forth.

13. In a glassware-finishing machine, the combination with a spindle upon the upper end of which the article to be operated upon is placed and a step-bearing for the extreme lower end of the spindle, of a cup or former constructed to receive and inclose the article and communicate an accelerated rotary motion to it and the spindle supporting it, substantially as set forth.

14. In a glassware-finishing machine, the combination with a rotary cup or former, of a rotary device extending into and holding the material to be operated upon between it and the bottom of the cup or former, and means for rotating these parts whereby the glass is made to conform to the interior wall of the cup or former by virtue of the centrifugal action thereupon.

15. The combination with a traveling rotary spindle having a collar thereon, and a rotary pulley upon which the collar rests for communicating rotary motion to the spindle through frictional contact therewith, of a cam rocker or step upon which the spindle rises and turns when in one of its positions, substantially as set forth.

16. The combination with a plate capable of being turned and having a series of extended vertical bearings thereon, of spindles revolubly supported in the bearings, means for rotating the spindles, and a cam rocker or step upon which the spindles successively rise and turn, substantially as set forth.

17. The combination with a plate constructed to be revolved, and having a series of vertical bearings thereon, of spindles revolubly supported in each of these bearings said spindles carrying the article to be operated upon on their upper ends, and a cup or former adapted to descend and inclose and communicate rotary motion to each spindle as it comes into position beneath it, substantially as set forth.

18. The combination with a stationary column, a rotary shaft therein, and a gear-wheel secured to the shaft, of a plate capable of turning around the column and having a series of vertical bearings, spindles in these bearings having each a collar thereon, a pulley upon which each collar rests, a pulley surrounding the column and provided with internal teeth, a gear-wheel therein for communicating motion from the gear-wheel on the shaft to the pulley having the internal teeth, and an endless belt passing around this pulley and the several pulleys upon which the collars on the spindles rest, substantially as set forth.

19. The combination with a stationary column, a rotary shaft therein having a gear-wheel thereon of a plate capable of turning around the column and having a series of vertical bearings, spindles in these bearings, having each a collar thereon, a pulley upon which each collar rests, a pulley surrounding the column immediately beneath the turn plate or table, said pulley having internal gear-teeth, a gear-wheel for communicating motion from the gear on the shaft to this pulley, ball-bearings beneath the pulley a belt for imparting motion to each of the spindle-pulleys from this pulley with the internal teeth, a cam rocker or step to raise each spindle from its support upon the pulley, when the plate or turn-table is in a certain position, means for temporarily locking that plate or turn-table, and means for applying positive rotary motion to said raised spindle from the shaft, substantially as set forth.

In testimony whereof I have signed this specification in the presence of two subscribing witnesses.

JNO. R. BRIDGES.

Witnesses:
WM. F. DUNCAN,
R. C. LOVERING.